(12) United States Patent
Agrawal

(10) Patent No.: US 9,691,288 B2
(45) Date of Patent: Jun. 27, 2017

(54) SYSTEM AND METHOD FOR SENDING IN-FLIGHT WEATHER ALERTS

(71) Applicant: AIRBUS GROUP INDIA PRIVATE LIMITED, Bangalore (IN)

(72) Inventor: Ashutosh Agrawal, Bangalore (IN)

(73) Assignee: AIRBUS GROUP INDIA PRIVATE LIMITED, Bangalore, Karnataka (IN)

( * ) Notice: Subject to any disclaimer, the term of this patent is extended or adjusted under 35 U.S.C. 154(b) by 80 days.

(21) Appl. No.: 14/795,895

(22) Filed: Jul. 10, 2015

(65) Prior Publication Data

US 2016/0019798 A1   Jan. 21, 2016

(30) Foreign Application Priority Data

Jul. 17, 2014  (IN) ............................ 3523/CHE/2014

(51) Int. Cl.
*G08G 5/00* (2006.01)
*G01W 1/08* (2006.01)
*B64D 45/00* (2006.01)
*G01W 1/00* (2006.01)

(52) U.S. Cl.
CPC ............ *G08G 5/0091* (2013.01); *B64D 45/00* (2013.01); *G01W 1/08* (2013.01); *G08G 5/0013* (2013.01); *G08G 5/0026* (2013.01); *G01W 2001/006* (2013.01)

(58) Field of Classification Search
CPC .............. G08G 5/0039; G08G 5/0021; G08G 5/0013; G08G 5/0034; G08G 5/0091; G08G 5/0026; G01W 1/08; G01W 2001/006
See application file for complete search history.

(56) References Cited

U.S. PATENT DOCUMENTS

| | | | |
|---|---|---|---|
| 6,014,606 A * | 1/2000 | Tu ........................... | G01W 1/08 342/26 A |
| 2013/0006512 A1* | 1/2013 | Saggio, III ........... | G08G 5/0013 701/120 |
| 2014/0358441 A1* | 12/2014 | Hale ........................ | G01W 1/02 702/3 |
| 2015/0304813 A1* | 10/2015 | Esposito ................ | H04B 7/155 455/456.2 |
| 2015/0339933 A1* | 11/2015 | Batla ..................... | G08G 5/0069 701/120 |
| 2016/0217694 A1* | 7/2016 | Batla ..................... | G08G 5/0034 |
| 2016/0327406 A1* | 11/2016 | Oostveen ........... | G01C 21/3667 |

* cited by examiner

*Primary Examiner* — Rodney Butler
(74) *Attorney, Agent, or Firm* — Prakash Nama; Global IP Services, PLLC

(57) ABSTRACT

A system and method for sending weather alerts to an aircraft during flight are disclosed. In one embodiment, in-flight weather information is obtained from one or more aircrafts at regular intervals. Further, weather conditions along a predicted flight trajectory of the aircraft are determined using the obtained in-flight weather information. The aircraft is preceding the one or more aircrafts. Furthermore, the weather alerts associated with the weather conditions are sent to a display in the aircraft during flight.

15 Claims, 7 Drawing Sheets

SYSTEM AND METHOD FOR SENDING IN-FLIGHT WEATHER ALERTS

RELATED APPLICATIONS

Benefit is claimed under 35 U.S.C. 119(a)-(d) to Foreign application Serial No. 3523/CHE/2014 filed in India entitled "SYSTEM AND METHOD FOR SENDING IN-FLIGHT WEATHER ALERTS", on Jul. 17, 2014, by AIRBUS GROUP INDIA PRIVATE LIMITED, which is herein incorporated in its entirety by reference for all purposes.

TECHNICAL FIELD

Embodiments of the present subject matter generally relate to weather alerts, and more particularly, to sending in-flight weather alerts.

BACKGROUND

Typically, on-board weather radars are used to detect information about adverse weather conditions that are hazardous to an aircraft. For example, the adverse weather conditions include thunderstorms, icing, turbulence, wind shear and so on. Further, the on-board weather radars may provide the information about adverse weather conditions to pilot before the aircraft enters areas with the adverse weather conditions.

However, the on-board weather radars can only detect weather information within 320 nautical miles (NM) of the aircraft. Further, the on-board weather radars may be able to detect wet turbulence within 40NM and may not be able to detect turbulence in clear air. Also, on-board weather radars may not be able to detect clouds or fog, sandstorms, wind shear, lightning and so on. In addition, dry snow and hail which are of higher threat have low reflectivity to weather radar signals. Thus increasing pilot workload to interpret radar images and adjust tilt, gain and the like. In such situations, pilots may rely upon communications with ground personnel. However, there can be a lag between the time a request for information is made and the time that the information is received. Also, the above obtained information is oral and/or textual and, therefore, may require the pilot to visualize location of the adverse weather conditions.

SUMMARY

A system and method for sending in-flight weather alerts are disclosed. According to one aspect of the present subject matter, in-flight weather information is obtained from one or more aircrafts at regular intervals. Further, weather conditions along a predicted flight trajectory of an aircraft are determined using the obtained in-flight weather information. The aircraft is preceding the one or more aircrafts. Furthermore, weather alerts associated with the weather conditions are sent to a display in the aircraft during flight.

According to another aspect of the present subject matter, a weather alert system includes one or more processors and a memory coupled to the processors. Further, the memory includes a weather alert module to perform the method described above.

According to yet another aspect of the present subject matter, a non-transitory computer-readable storage medium for sending in-flight weather alerts, having instructions that, when executed by a computing device causes the computing device to perform the method described above.

The system and method disclosed herein may be implemented in any means for achieving various aspects. Other features will be apparent from the accompanying drawings and from the detailed description that follow.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Embodiments described herein provide methods, techniques, and systems for sending in-flight weather alerts. The example technique obtains in-flight weather information from one or more aircrafts. For example, the in-flight weather information includes weather condition parameters and longitude, latitude, altitude, time of observation and the like of the weather condition parameters. The weather condition parameters may include turbulence parameters, reactive wind shear parameters, presence of icing conditions, lightning detection and so on. The turbulence parameters may include eddy dissipation rates (EDRs), acceleration (g) changes along axes and the like. Further, a weather grid is updated using the obtained weather information. Furthermore, weather conditions (e.g., turbulence conditions, icing conditions, thunderstorm conditions, wind shear conditions and so on) along a predicted flight trajectory of a preceding aircraft are determined using the updated weather grid. Also, the weather alerts are sent to a display of the preceding aircraft during flight.

Figure 1:
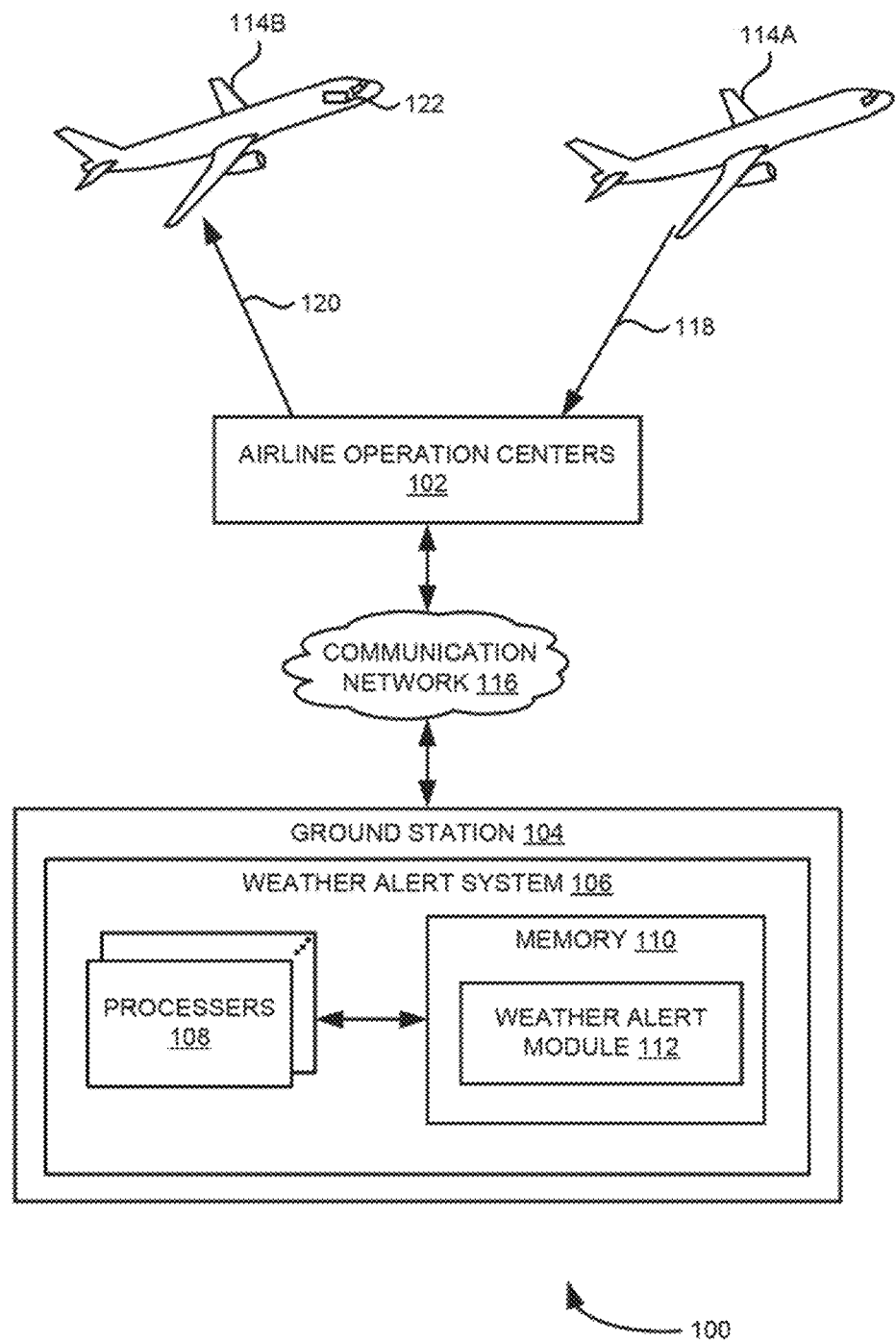
FIG. 1 is a block diagram illustrating an exemplary system for sending in-flight weather alerts, according to one embodiment.

Referring now to FIG. 1, which is a block diagram illustrating an exemplary system 100 for sending in-flight weather alerts, according to one embodiment. As shown in FIG. 1, the system 100 includes airline operation centers 102 and a ground station 104. For example, the airline operation centers 102 include operation centers associated with different airlines at various locations. Further as shown in FIG. 1, the ground station 104 includes a weather alert system 106 having one or more processors 108 and a memory 110 coupled to the processors 108. Furthermore, the memory 110 includes a weather alert module 112.

In addition, the ground station 104 is communicatively connected to the airline operation centers 102 via a communication network 116. Exemplary communication network 116 includes Internet, a virtual private network (VPN) and the like. Also, the airline operation centers 102 communicate with associated aircrafts within the vicinity of the airline operation centers 102 via high frequency/very high frequency (HF/VHF) channels and the like. In the example illustrated in FIG. 1, the airline operation centers 102 communicate with aircrafts 114A and 114B via HF/VHF channels and the like. In this example, the aircraft 114B is preceding the aircraft 114A.

In operation, the airline operation centers 102 receive in-flight weather information 118 associated with the aircraft 114A from the airline operation centers 102 at regular intervals. For example, the in-flight weather information includes weather condition parameters and longitude, latitude, altitude, time of observation and the like of the weather condition parameters. The weather condition parameters may include turbulence parameters, reactive wind shear parameters, presence of icing conditions, lightning detection and so on. The turbulence parameters may include eddy dissipation rates (EDRs), acceleration (g) changes along axes and the like. In one example, the aircraft 114A sends the in-flight weather information every 30 to 40 seconds during a climb phase and descent phase and every 1 to 3 minutes during a cruise phase.

Further in operation, the weather alert module 112 obtains the in-flight weather information from the airline operation centers 102 via the communication network 116. In one example, the weather alert module 112 can directly communicate with the aircraft 114A. Furthermore, the weather alert module 112 updates a weather grid (e.g., a weather grid 200 shown in FIG. 2), residing in the memory 110, using the obtained in-flight weather information. For example, a weather grid represents geographical area which is divided into a mesh of regularly spaced grid points. Further, the grid points are the locations at which the weather information is obtained. This is explained in detail with reference to FIG. 2. Moreover, the weather alert module 112 determines weather conditions along a predicted flight trajectory of the aircraft 114B using the updated weather grid. For example, the weather conditions include turbulence conditions, icing conditions, thunderstorm conditions, wind shear conditions and the like. In one example implementation, the weather alert module 112 determines the turbulence conditions along the predicted flight trajectory of the aircraft 114B using the obtained EDRs (as shown in FIG. 3) and/or acceleration changes along axes of the aircraft 114A. In one example, if the acceleration change is beyond a threshold value, then it is classified as the turbulence conditions. If the acceleration change is below the threshold value, then it is classified as aircraft maneuvering, such as turning, ascent, descent and so on.

In another example implementation, the weather alert module 112 determines the wind shear conditions along the predicted flight trajectory of the aircraft 114B based on a value of the obtained reactive wind shear parameters (which are measured on-board the aircraft 114A based on wind velocity and/or direction). For example, if the value of the obtained reactive wind shear parameter is above a threshold value, then it is classified as a wind shear condition. If the value of the obtained reactive wind shear parameter is less than the threshold value, then it is classified as normal aircraft movement. In yet another example implementation, the weather alert module 112 determines the icing conditions along the predicted flight trajectory of the aircraft 114B based on the presence of icing conditions. In one example implementation, the weather alert module 112 determines the thunderstorm conditions along the predicted flight trajectory of the aircraft 114B based on the obtained lightning detection. This is explained in more detailed with reference to FIG. 4.

Also in operation, the weather alert module 112 sends weather alerts 120 associated with the weather conditions to a display 122 in the aircraft 114B during flight via the airline operation centers 102. For example, the weather alerts include location (e.g., longitude and latitude) and severity of the weather conditions. In one example implementation, the weather alert module 112 sends the weather alerts 120 associated with the weather conditions to the display 122 in the aircraft 114B during flight based on parameters associated with the aircraft 114B. Exemplary parameters associated with an aircraft include a type, size, weight, location and the like of the aircraft. In one example, turbulence experienced by the aircraft 114A may not affect the aircraft 114B when the aircraft 114A and aircraft 114B are of different types.

Figure 2:
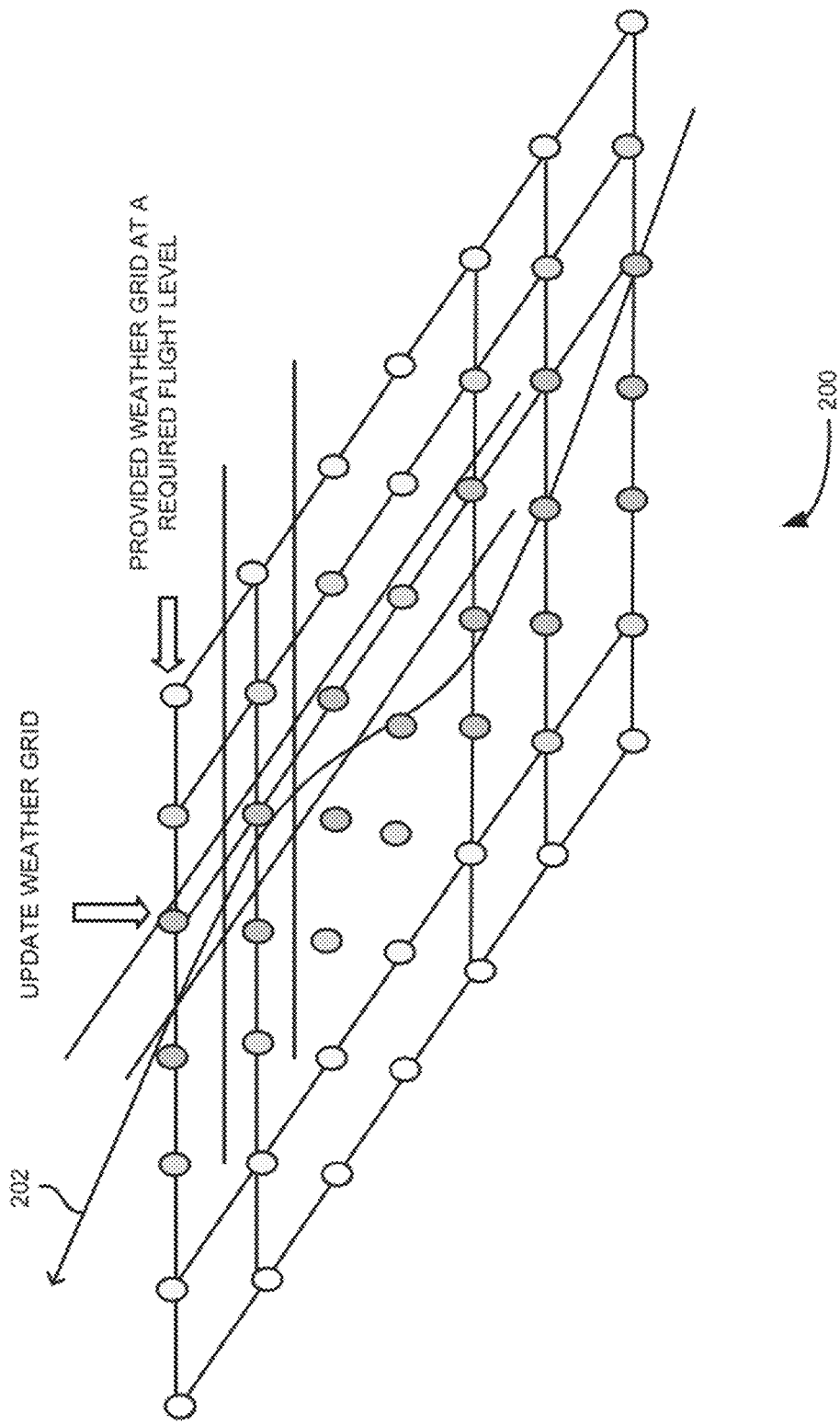
FIG. 2 is a schematic diagram depicting updating weather information in a weather grid, according to one embodiment.
Figure 3:
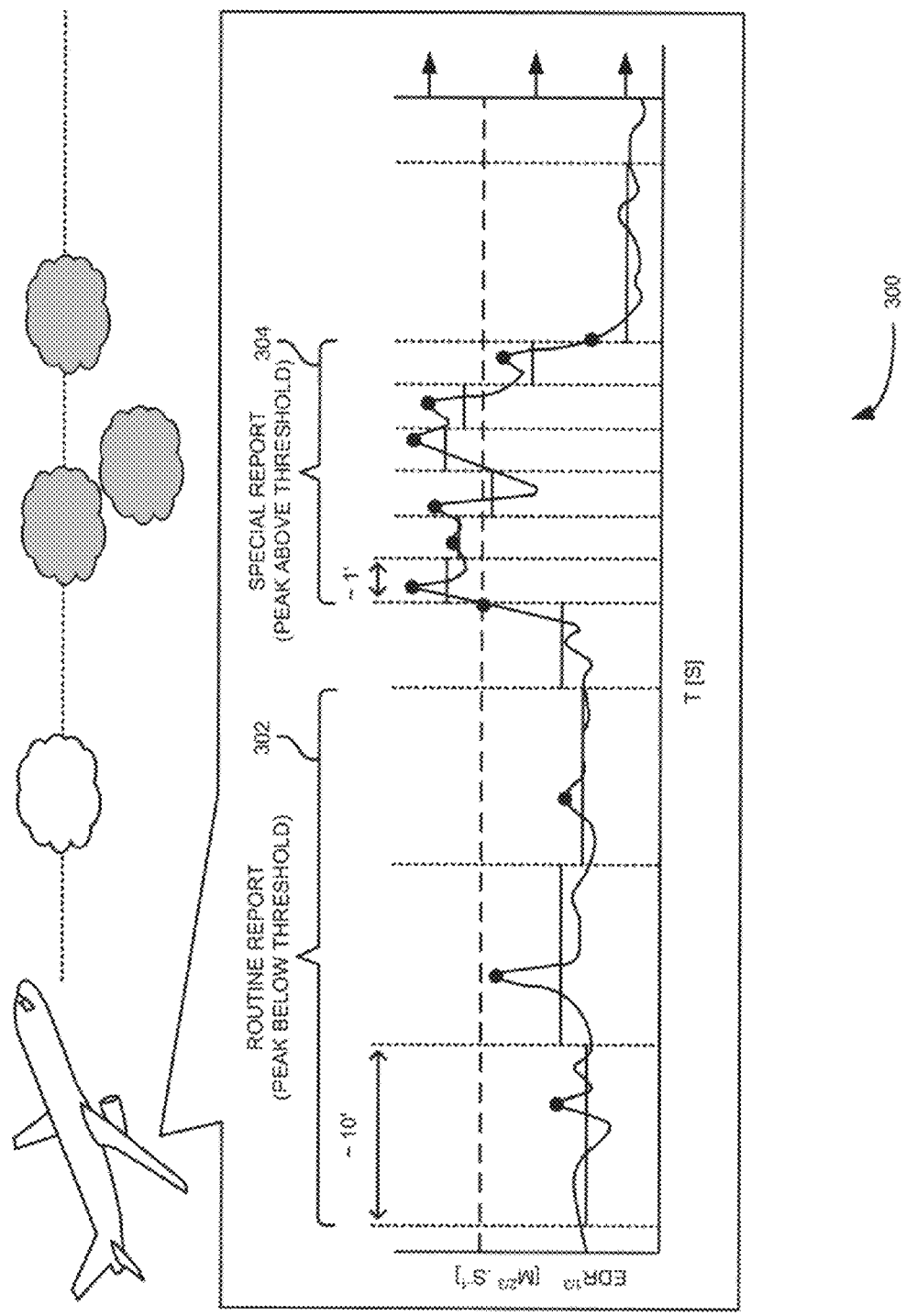
FIG. 3 is a graph depicting a turbulence parameter (eg., an eddy dissipation rate (EDR)) obtained from an aircraft, according to one embodiment.

Referring now to FIG. 2, which is a schematic diagram depicting updating weather information in the weather grid 200, according to one embodiment. As shown in FIG. 2, the weather grid 200 includes a plurality of regularly spaced nodes at specified altitudes. For example, each node in the weather grid 200 is associated with latitude and longitude values which represent a specific location at which the weather information is obtained. Further, the weather grid 200 includes weather information along flight trajectories of various aircrafts. In the example illustrated in FIG. 2, the weather grid 200 includes weather information along a flight trajectory 202 of the aircraft 114A, shown in FIG. 1. Further, the weather alert module 112, shown in FIG. 1, obtains in-flight weather information from the aircraft 114A when the aircraft encounters adverse weather conditions. Furthermore, the weather alert module 112 updates the weather information in the weather grid 200 using the obtained in-flight weather information. In other words, the weather alert module 112 updates the weather grid 200 to indicate the adverse weather conditions encountered by the aircraft 114A at various locations (e.g., latitudes and longitudes). The weather alert module 112 then uses the updated weather information in the weather grid 200 to send the weather alerts to the display 122 of the aircraft 114B, shown in FIG. 1, before the aircraft 114B enters areas with the adverse weather conditions.

One can envision that the weather information in the updated weather grid 200 can be used for computing trip fuel requirements of any aircraft preceding the aircraft 114A.

Referring now to FIG. 3, which is a graph 300 depicting a turbulence parameter (eg., EDR) obtained from the aircraft 114A, according to one embodiment. As shown in FIG. 3, a peak of the EDR is below a predetermined threshold (indicated as 302) when the aircraft 114A experiences normal weather conditions and a peak of the EDR is above the predetermined threshold (indicated as 304) when the aircraft 114A experiences adverse weather conditions (turbulence conditions).

Figure 4:
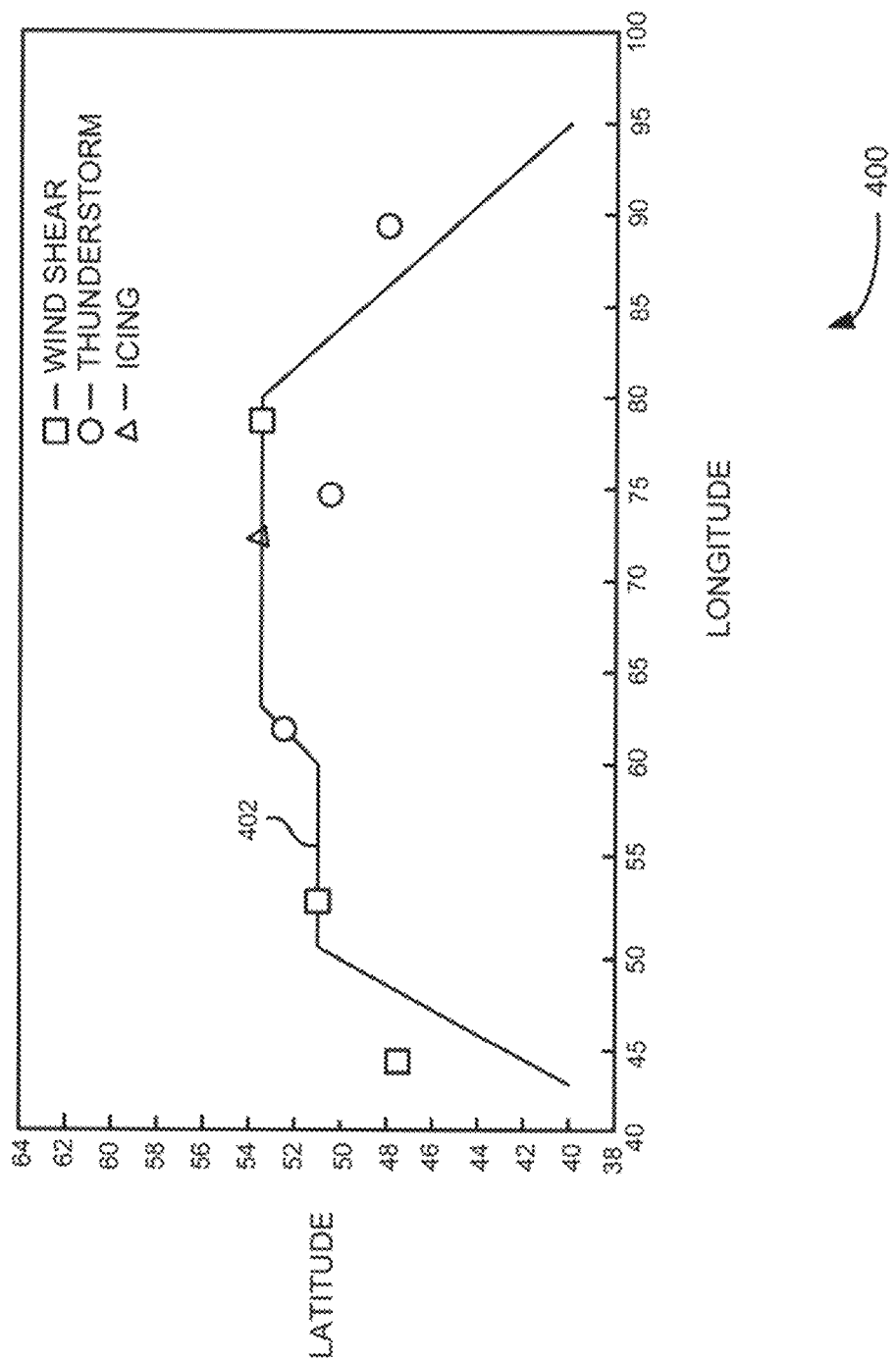
FIG. 4 is a graph depicting thunderstorm, wind shear and icing conditions along a predicted flight trajectory of an aircraft, according to one embodiment.

Referring now to FIG. 4, which is a graph 400 depicting thunderstorm, wind shear and icing conditions along a predicted flight trajectory 402 of an aircraft (e.g., the aircraft 114B shown in FIG. 1), according to one embodiment. As shown in the graph 400, the x-axis indicates longitude and y-axis indicates latitude. Further, the graph 400 illustrates the thunderstorm, wind shear and icing conditions at various points along the predicted flight trajectory 402 of the aircraft. The graph 400 is obtained using the updated weather information in the weather grid 200, shown in FIG. 2. Using this information, the weather alert module 112, shown in FIG. 1, sends weather alerts including location (e.g., longitude and latitude) and severity of the thunderstorm, wind shear and icing conditions to a display of the aircraft, during flight, before the aircraft enters areas with the thunderstorm, wind shear and icing conditions.

Figure 5:
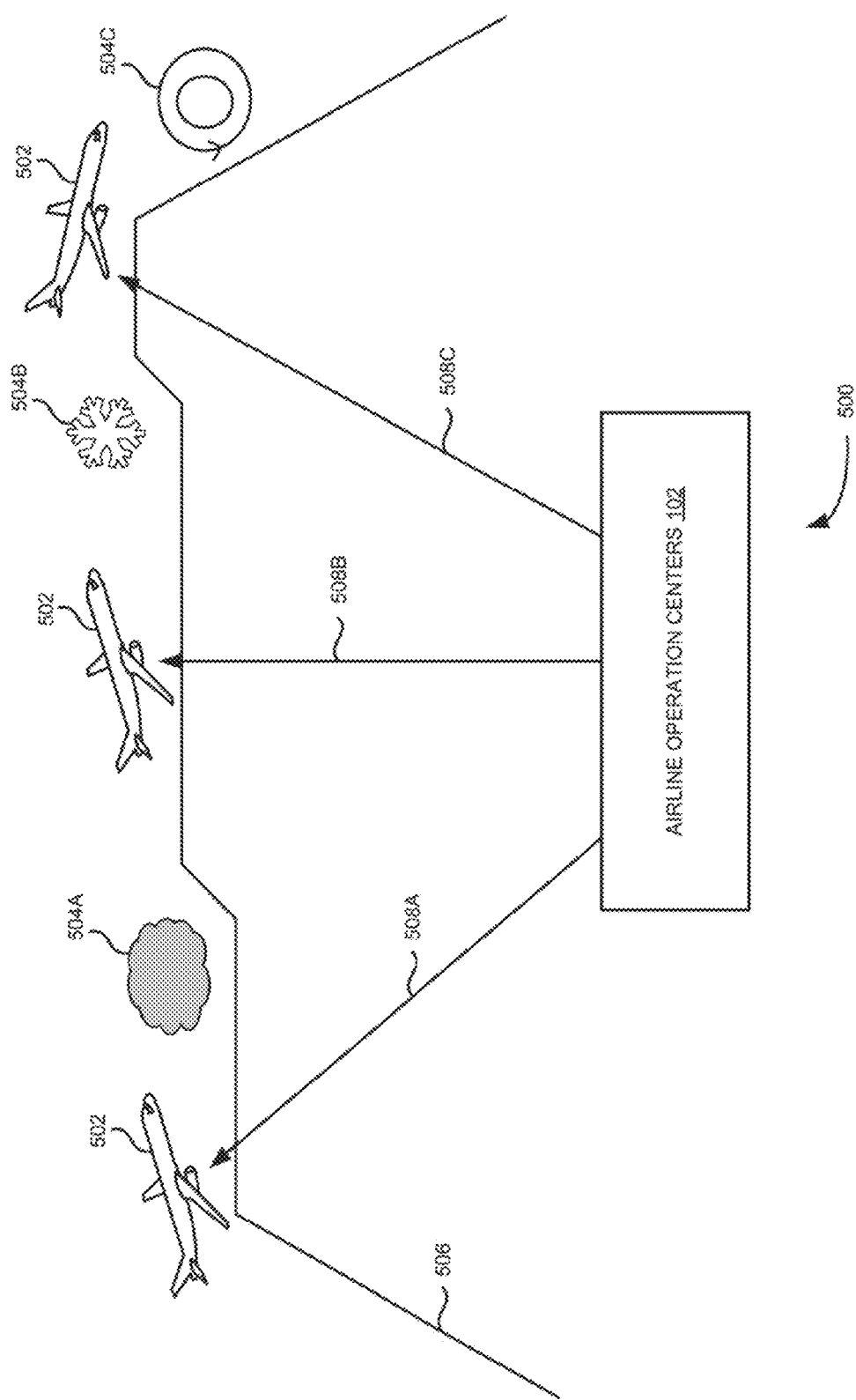
FIG. 5 is a schematic diagram depicting sending in-flight weather alerts, according to one embodiment.

Referring now to FIG. 5, which is a schematic diagram 500 depicting sending in-flight weather alerts, according to one embodiment. As shown in the FIG. 5, the schematic diagram 500 illustrates adverse weather conditions, such as turbulence conditions 504A, icing conditions 504B, and wind shear conditions 504C along a predicted flight trajectory 506 of an aircraft 502. Further, the schematic diagram 500 illustrates the airline operations centers 102, shown in FIG. 1, sending the weather alerts 508A, 508B, and 508C associated with the turbulence conditions 504A, icing conditions 504B, and wind shear conditions 504C to a display of the aircraft 502, during flight, before the aircraft 502 enters the areas with the turbulence conditions 504A, icing conditions 504B, and wind shear conditions 504C.

Figure 6:
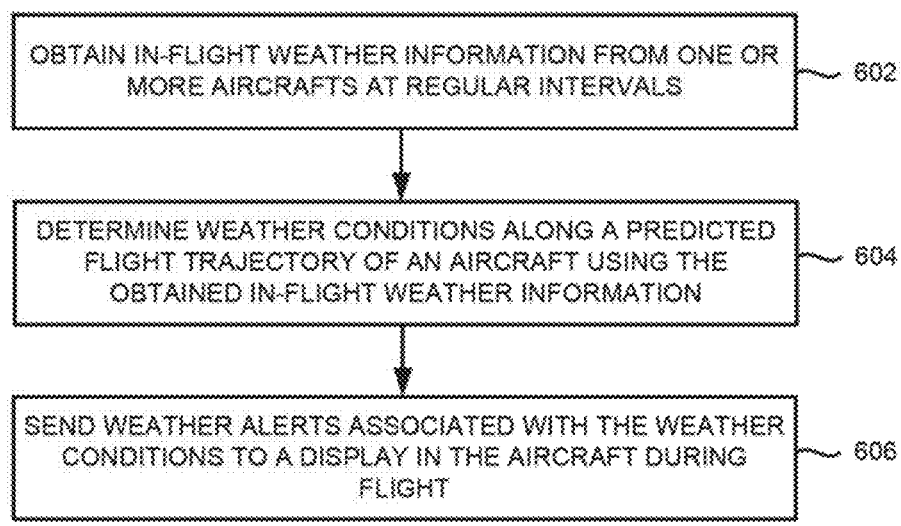
FIG. 6 is a flow diagram illustrating an example method for sending in-flight weather alerts, according to one embodiment.

FIG. 6 is a flow diagram 600 illustrating an example method for sending in-flight weather alerts, according to one embodiment. At block 602, in-flight weather information is obtained from one or more aircrafts at regular intervals. For example, the in-flight weather information includes weather condition parameters, longitude, latitude, altitude, and time of observation of the weather condition parameters and so on. The weather condition parameters may include eddy dissipation rates (EDRs), acceleration changes along axes, reactive wind shear parameters, presence of icing conditions, lightning detection and so on.

At block 604, weather conditions along a predicted flight trajectory of an aircraft are determined using the obtained in-flight weather information. The aircraft is preceding the one or more aircrafts and in vicinity of the one or more aircrafts. For example, the weather conditions include turbulence conditions, icing conditions, thunderstorm conditions, wind shear conditions and so on. In one embodiment, one or more of the turbulence conditions, icing conditions, thunderstorm conditions, wind shear conditions along the predicted flight trajectory of the aircraft are determined using the obtained in-flight weather information. In one example implementation, the turbulence conditions along the predicted flight trajectory of the preceding aircraft are determined using the obtained EDRs and/or acceleration changes along axes of the one or more aircrafts. The wind shear conditions along the predicted flight trajectory of the preceding aircraft are determined based on the reactive wind shear parameters. The icing conditions along the predicted flight trajectory of the preceding aircraft are determined based on the presence of icing conditions. The thunderstorm conditions along the predicted flight trajectory of the preceding aircraft are determined based on the lightning detection.

At block 606, weather alerts associated with the weather conditions are sent to a display in the preceding aircraft during flight. For example, the weather alerts include location of the weather conditions, severity of the weather conditions and so on. In one example embodiment, the weather alerts associated with the weather conditions are sent to the display in the preceding aircraft during flight based on parameters associated with the preceding aircraft. For example, the parameters include a type, size, weight, location and so on of the preceding aircraft. The process of sending the in-flight weather alerts is explained in more detail with reference to FIGS. 1-5.

Figure 7:
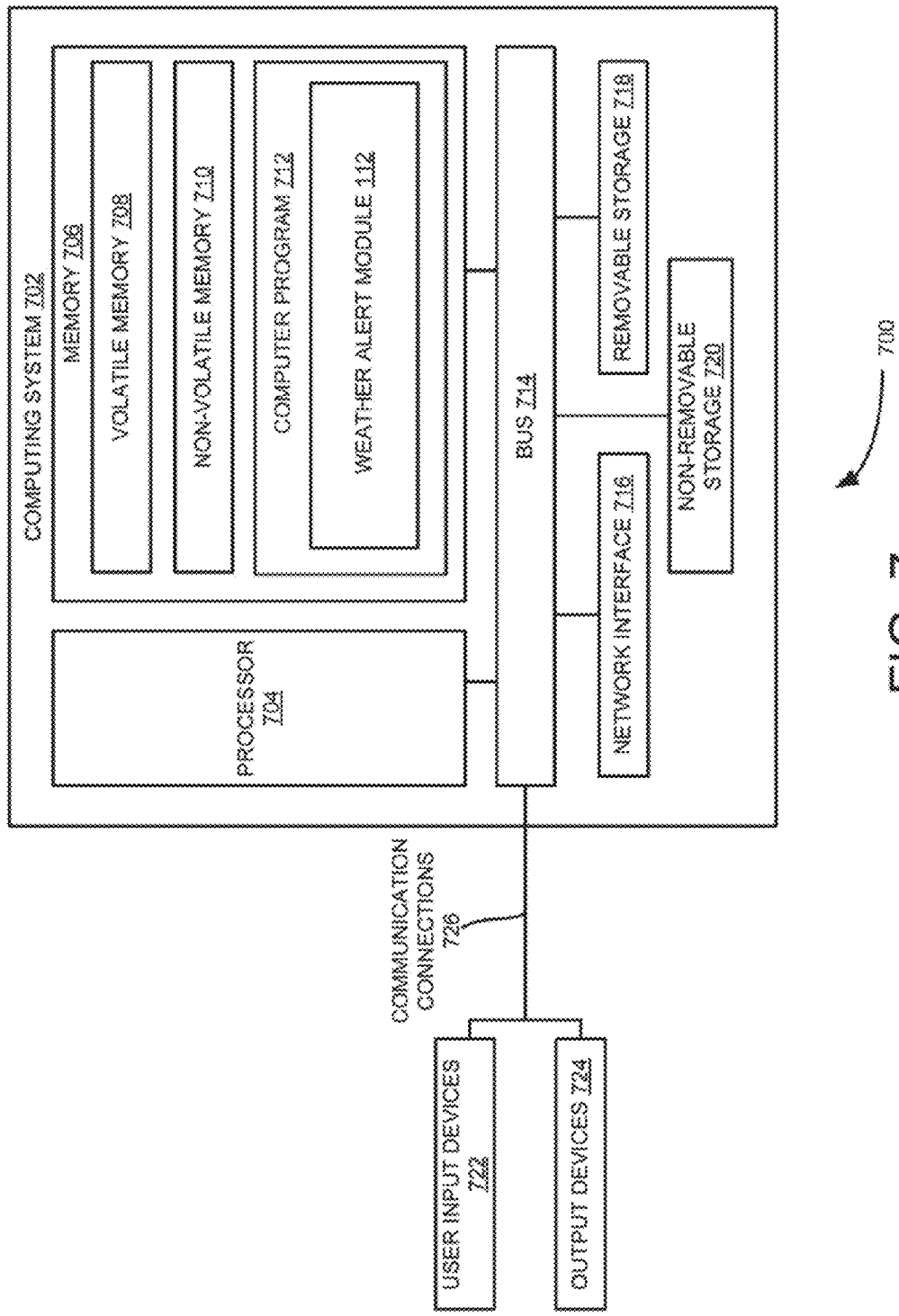
FIG. 7 is a block diagram of an example computing system including a weather alert module for sending in-flight weather alerts, using the process described in FIG. 6, according one embodiment.

Referring now to FIG. 7, which illustrates an example computing system 702 including the weather alert module 112 for sending in-flight weather alerts, using the process described with reference to FIG. 6 and the following discussions are intended to provide a brief, general description of a suitable computing environment in which certain embodiments of the inventive concepts contained herein are implemented.

The computing system 702 includes a processor 704, memory 706, a removable storage 718, and a non-removable storage 720. The computing system 702 additionally includes a bus 714 and a network interface 716. As shown in FIG. 7, the computing system 702 includes access to the computing system environment 700 that includes one or more user input devices 722, one or more output devices 724, and one or more communication connections 726 such as a network interface card and/or a universal serial bus connection.

Exemplary user input devices 722 include a digitizer screen, a stylus, a trackball, a keyboard, a keypad, a mouse and the like. Exemplary output devices 724 include a display unit of the personal computer, a mobile device, and the like. Exemplary communication connections 726 include a local area network, a wide area network, and/or other network.

The memory 706 further includes volatile memory 708 and non-volatile memory 710. A variety of computer-readable storage media are stored in and accessed from the memory elements of the computing system 702, such as the volatile memory 708 and the non-volatile memory 710, the removable storage 718 and the non-removable storage 720. The memory elements include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 704, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 704 also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 704 of the computing system 702. For example, a computer program 712 includes machine-readable instructions capable for sending the in-flight weather alerts, according to the teachings and herein described embodiments of the present subject matter. In one embodiment, the computer program 712 is included on a compact disk-read only memory (CD-ROM) and loaded from the CD-ROM to a hard drive in the non-volatile memory 710. The machine-readable instructions cause the computing system 702 to encode according to the various embodiments of the present subject matter.

As shown, the computer program 712 includes the weather alert module 112. For example, the weather alert module 112 can be in the form of instructions stored on a non-transitory computer-readable storage medium. The non-transitory computer-readable storage medium having the instructions that, when executed by the computing system 702, causes the computing system 702 to perform the method described in FIG. 6.

The methods described herein with reference to FIG. 6, is performed in the weather alert module 112 in the ground station 104. However, one can envision that, the weather alert module 112 may be deployed on-board aircrafts.

In various embodiments, the systems and methods described in FIGS. 1 through 7 propose a technique for sending in-flight weather alerts. In other words, the proposed technique sends weather alerts to a display of an aircraft before the aircraft enters areas with adverse weather conditions. The weather alerts may include location and severity of the weather conditions. Thus providing weather awareness to pilot of the aircraft for taking a proper action to avoid entering the areas with the weather conditions.

Although certain methods, systems, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A weather alert system, comprising:
   at least one processor; and
   a memory coupled to the at least one processor, wherein the memory comprises a weather alert module to:
      obtain in-flight weather information from at least one aircraft at regular intervals;
      determine weather conditions along a predicted flight trajectory of an aircraft using the obtained in-flight weather information, wherein the aircraft is preceding the at least one aircraft; and
      send weather alerts associated with the weather conditions to a display in the aircraft during flight based on parameters associated with the aircraft, wherein the parameters associated with the aircraft are selected from the group consisting of a type, size, weight and location of the aircraft.

2. The weather alert system of claim 1, wherein the in-flight weather information comprises weather condition parameters and longitude, latitude, altitude and time of observation of the weather condition parameters, wherein the weather condition parameters are selected from the group consisting of turbulence parameters, reactive wind shear parameters, presence of icing conditions and lightning detection and wherein the turbulence parameters are selected from the group consisting of eddy dissipation rates (EDRs) and acceleration (g) changes along axes on the at least one aircraft.

3. The weather alert system of claim 2, wherein the weather conditions are selected from the group consisting of turbulence conditions, icing conditions, thunderstorm conditions, and wind shear conditions.

4. The weather alert system of claim 3, wherein the weather alert module is configured to:
   perform at least one of:
      determining the turbulence conditions along the predicted flight trajectory of the aircraft using the obtained EDRs and/or acceleration changes along axes of the at least one aircraft;
      determining the wind shear conditions along the predicted flight trajectory of the aircraft based on the reactive wind shear parameters;
      determining the icing conditions along the predicted flight trajectory of the aircraft based on the presence of icing conditions; and
      determining the thunderstorm conditions along the predicted flight trajectory of the aircraft based on the lightning detection.

5. The weather alert system of claim 1, wherein the weather alerts comprise location of the weather conditions and severity of the weather conditions.

6. A method for sending in-flight weather alerts, comprising:
   obtaining in-flight weather information from at least one aircraft at regular intervals;
   determining weather conditions along a predicted flight trajectory of an aircraft using the obtained in-flight weather information, wherein the aircraft is preceding the at least one aircraft and
   sending weather alerts associated with the weather conditions to a display in the aircraft during flight based on parameters associated with the aircraft, wherein the parameters associated with the aircraft are selected from the group consisting of a type, size, weight and location of the aircraft.

7. The method of claim 6, wherein the in-flight weather information comprises weather condition parameters and longitude, latitude, altitude and time of observation of the weather condition parameters; wherein the weather condition parameters are selected from the group consisting of turbulence parameters, reactive wind shear parameters, presence of icing conditions and lightning detection and wherein the turbulence parameters are selected from the group consisting of eddy dissipation rates (EDRs) and acceleration (g) changes along axes on the at least one aircraft.

8. The method of claim 7, wherein the weather conditions are selected from the group consisting of turbulence conditions, icing conditions, thunderstorm conditions, and wind shear conditions.

9. The method of claim 8, wherein determining, the weather conditions along the predicted flight trajectory of the aircraft using the obtained in-flight weather information, comprises:
   performing at least one of:
      determining the turbulence conditions along the predicted flight trajectory of the aircraft using the obtained EDRs and/or acceleration changes along axes of the at least one aircraft;
      determining the wind shear conditions along the predicted flight trajectory of the aircraft based on the reactive wind shear parameters;

determining the icing conditions along the predicted flight trajectory of the aircraft based on the presence of icing conditions; and determining the thunderstorm conditions along the predicted flight trajectory of the aircraft based on the lightning detection.

10. The method of claim 6; wherein the weather alerts comprise location of the weather conditions and severity of the weather conditions.

11. A non-transitory computer-readable storage medium including instructions executable by a computing device to:

obtain in-flight weather information from at least one aircraft at regular intervals;

determine weather conditions along a predicted flight trajectory of an aircraft using the obtained in-flight weather information, wherein the aircraft is preceding the at least one aircraft; and send weather alerts associated with the weather conditions to a display in the aircraft during flight based on parameters associated with the aircraft, wherein the parameters associated with the aircraft are selected from the group consisting of a type, size, weight and location of the aircraft.

12. The non-transitory computer-readable storage medium of claim 11, wherein the in flight weather information comprises weather condition parameters and longitude, latitude, altitude and time of observation of the weather condition parameters and wherein the weather condition parameters are selected from the group consisting of turbulence parameters, reactive wind shear parameters, presence of icing conditions and lightning detection and wherein the turbulence parameters are selected from the group consisting of eddy dissipation rates (EDRs) and acceleration (g) changes along axes on the at least one aircraft.

13. The non-transitory computer-readable storage medium of claim 12, wherein the weather conditions are selected from the group consisting of turbulence conditions, icing conditions, thunderstorm conditions, and wind shear conditions.

14. The non-transitory computer-readable storage medium of claim 13, wherein determining the weather conditions along, the predicted flight trajectory of the aircraft using the obtained in-flight weather information, comprises:

performing at least one of:

determining the turbulence conditions along the predicted flight trajectory of the aircraft using the obtained EDRs and/or acceleration changes along axes of the at least one aircraft;

determining the wind shear conditions along the predicted flight trajectory of the aircraft based on the reactive wind shear parameters;

determining the icing conditions along the predicted flight trajectory of the aircraft based on the presence of icing conditions; and determining the thunderstorm conditions along the predicted flight trajectory of the aircraft based on the lightning detection.

15. The non-transitory computer-readable storage medium of claim 11, wherein the weather alerts comprise location of the weather conditions and severity of the weather conditions.

* * * * *